(12) United States Patent
Sato et al.

(10) Patent No.: US 8,506,185 B2
(45) Date of Patent: Aug. 13, 2013

(54) CAMERA MODULE AND METHOD FOR MANUFACTURING CAMERA MODULE

(71) Applicant: Fujitsu Component Limited, Tokyo (JP)

(72) Inventors: Koki Sato, Tokyo (JP); Mitsuru Kobayashi, Tokyo (JP); Tetsugaku Tanaka, Tokyo (JP); Hideo Miyazawa, Tokyo (JP)

(73) Assignee: Fujitsu Component Limited, Tokyo (JP)

( * ) Notice: Subject to any disclaimer, the term of this patent is extended or adjusted under 35 U.S.C. 154(b) by 0 days.

(21) Appl. No.: 13/711,755

(22) Filed: Dec. 12, 2012

(65) Prior Publication Data

US 2013/0101281 A1 Apr. 25, 2013

Related U.S. Application Data

(62) Division of application No. 13/116,464, filed on May 26, 2011, now Pat. No. 8,356,950.

(30) Foreign Application Priority Data

May 31, 2010 (JP) ................................ 2010-124943
Apr. 20, 2011 (JP) ................................ 2011-094340

(51) Int. Cl.
*G03B 17/00* (2006.01)

(52) U.S. Cl.
USPC .......................................................... 396/529

(58) Field of Classification Search
USPC .................................................. 396/529, 535
See application file for complete search history.

(56) References Cited

U.S. PATENT DOCUMENTS

| 6,977,783 | B2 | 12/2005 | Lung | |
|---|---|---|---|---|
| 7,680,406 | B2 * | 3/2010 | Jung | 396/89 |
| 7,787,199 | B2 * | 8/2010 | Tsai et al. | 359/819 |
| 8,356,950 | B2 * | 1/2013 | Sato et al. | 396/529 |
| 2002/0101041 | A1 | 8/2002 | Kameyama | |
| 2002/0126457 | A1 | 9/2002 | Kameyama | |
| 2007/0057150 | A1 * | 3/2007 | Webster | 250/208.1 |
| 2007/0182842 | A1 | 8/2007 | Sonnenschein et al. | |
| 2011/0293264 | A1 | 12/2011 | Sato et al. | |

FOREIGN PATENT DOCUMENTS

JP 2007-004068 1/2007

* cited by examiner

*Primary Examiner* — W B Perkey
(74) *Attorney, Agent, or Firm* — IPUSA, PLLC

(57) ABSTRACT

A camera module includes a camera unit, a board, and a driving unit mounted on the board and configured to drive the camera unit. The camera module also includes an elastic camera-side connecting part configured to connect a terminal of the camera unit with wiring on a first surface of the board.

3 Claims, 17 Drawing Sheets

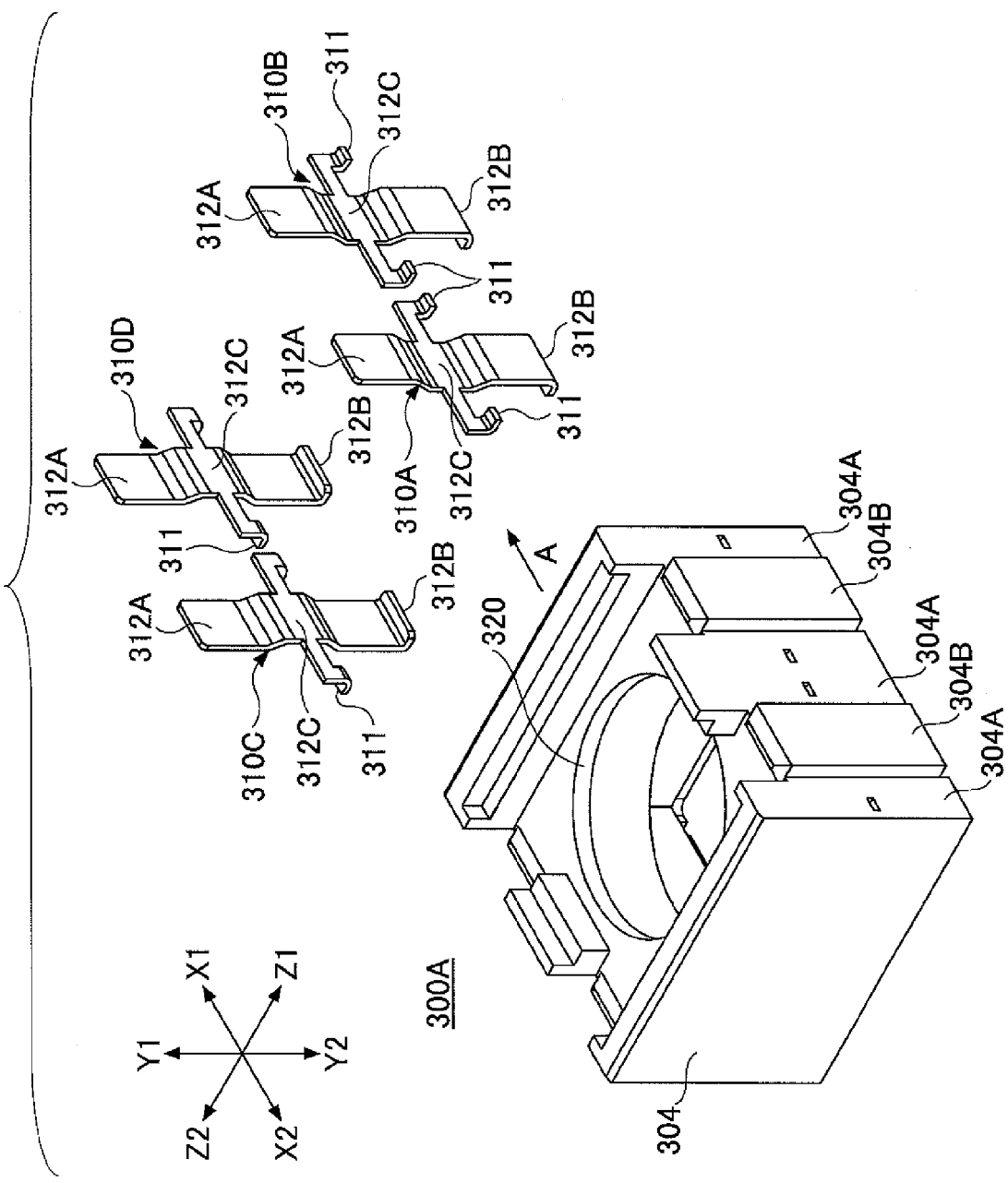

US 8,506,185 B2

CAMERA MODULE AND METHOD FOR MANUFACTURING CAMERA MODULE

CROSS-REFERENCE TO RELATED APPLICATION

This application is a divisional application of a U.S. patent application Ser. No. 13/116,464 filed on May 26, 2011. This application is based upon and claims the benefit of priority of Japanese Patent Application No. 2010-124943 filed on May 31, 2010, and Japanese Patent Application No. 2011-094340 filed on Apr. 20, 2011, the entire contents of which are incorporated herein by reference.

FIELD

The embodiments discussed herein are related to a camera module and a method of manufacturing the camera module.

BACKGROUND

There are various camera modules to be mounted on a vehicle. For example, a camera module includes a small camera such as a charge coupled device (CCD) camera and is used to view an area behind or on a side of a vehicle (see, for example, Japanese Laid-Open Patent Publication No. 2007-004068).

SUMMARY

According to an aspect of the invention, there is provided a camera module including a camera unit, a board, and a driving unit mounted on the board and configured to drive the camera unit. The camera module also includes an elastic camera-side connecting part configured to connect a terminal of the camera unit with wiring on a first surface of the board.

The aspects of the invention will be realized and attained by way of the elements and combinations particularly pointed out in the claims.

It is to be understood that both the foregoing general description and the followed detailed description are exemplary and explanatory and are not restrictive of the invention as claimed.

BRIEF DESCRIPTION OF DRAWINGS

FIGS. 12A through 12C are drawings illustrating a module 300A including a holder 304 and terminals 310;

DESCRIPTION OF EMBODIMENTS

One problem with related-art camera modules is their high manufacturing costs.

One aspect of this disclosure provides a camera module and a method of manufacturing the camera module that makes it possible to reduce the manufacturing costs.

Preferred embodiments of the present invention are described below with reference to the accompanying drawings.

<First Embodiment>

Figure 1:
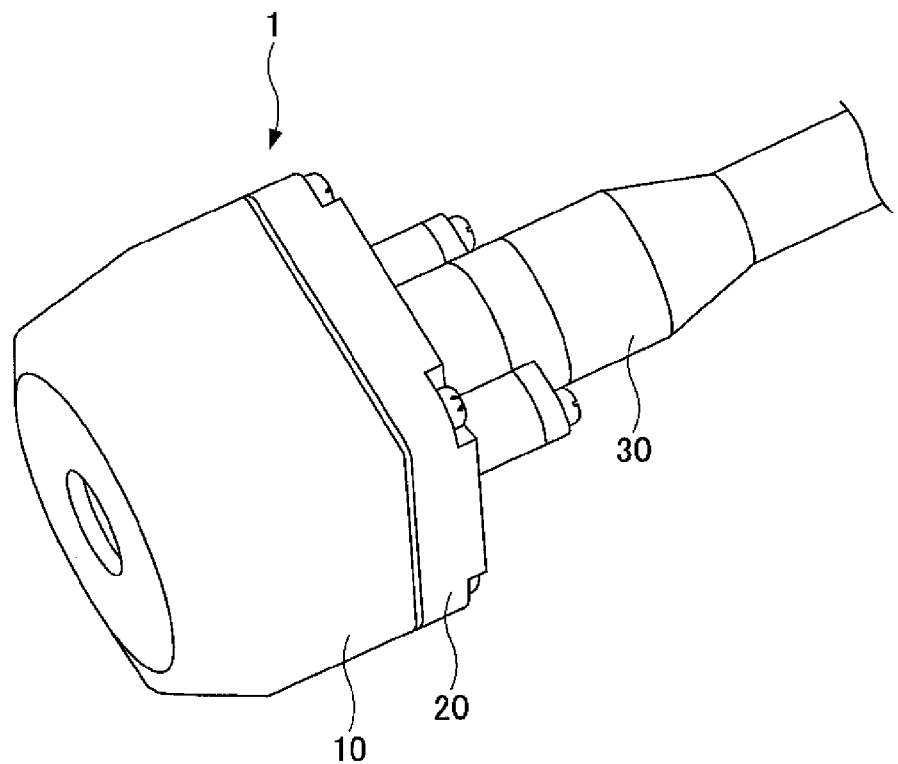
FIG. 1 is a perspective view of a camera module 1 according to a first embodiment.

FIG. 1 is a perspective view of a camera module 1 according to a first embodiment.

The camera module 1 includes a camera housing 10, a board housing 20, and a cable 30. The camera housing 10 houses a charge-coupled device (CCD) camera 100 (see FIGS. 2A and 2B) used as a camera unit for obtaining an image of an object. The board housing 20 houses a board 103 (see FIGS. 3A and 3B) on which a driving unit for driving the CCD camera 100 is mounted. The cable 30 is attached to the board housing 20 and is used, for example, to input control signals, to supply electric power, and to output image signals.

Figure 2A:
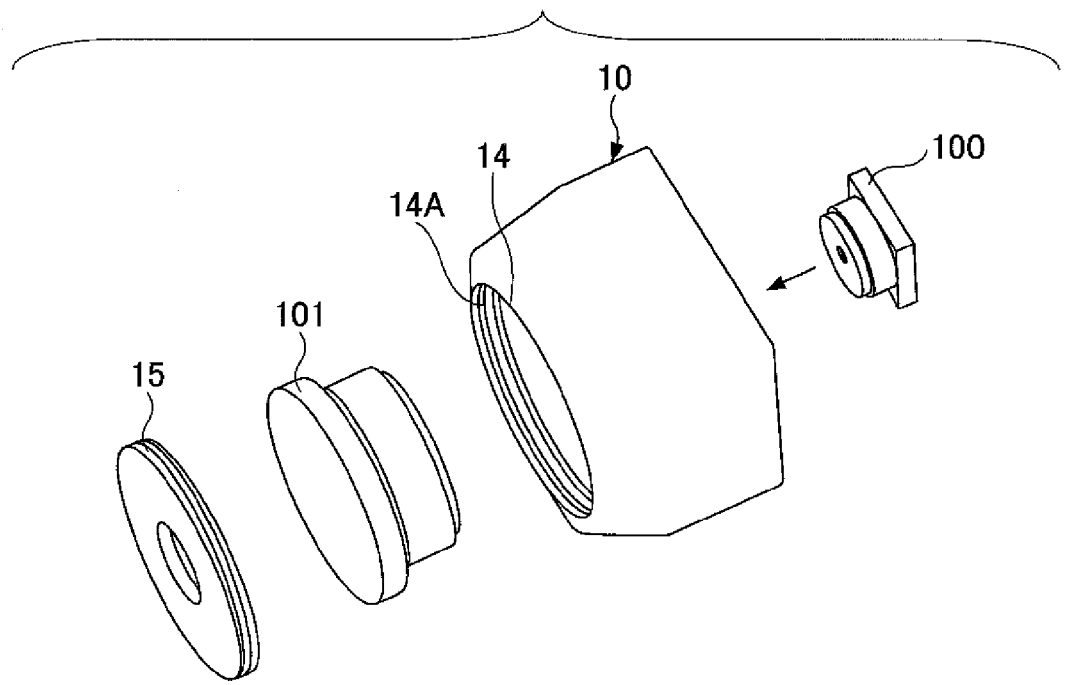
FIGS. 2A through 2C are drawings illustrating a camera housing 10 and components housed in the camera housing 10.
Figure 2B:
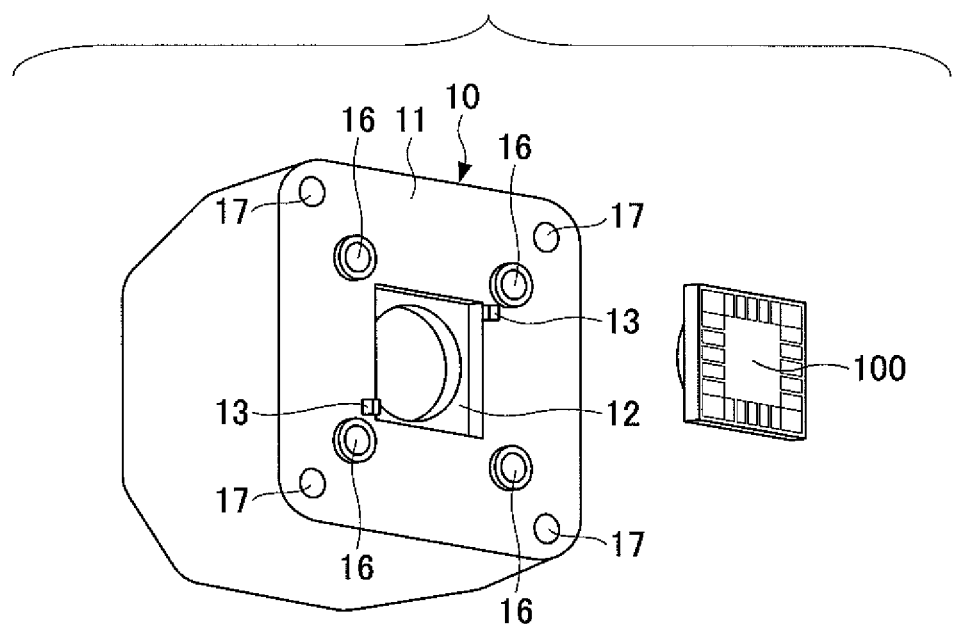
Figure 2C:
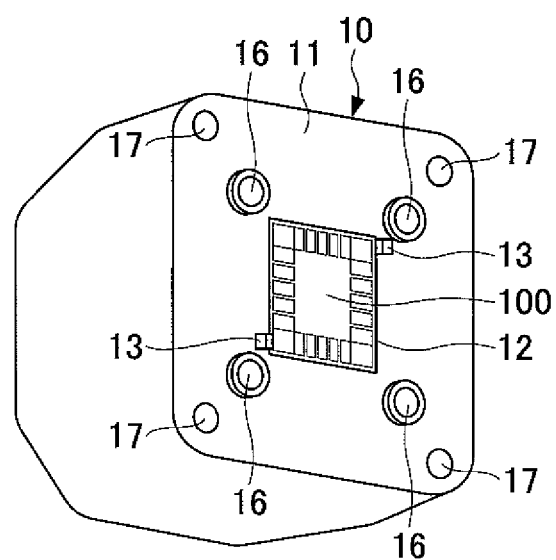

FIGS. 2A through 2C are drawings illustrating the camera housing 10 and components housed in the camera housing 10.

As illustrated in FIG. 2A, the camera housing 10 houses the CCD camera 100 and a lens 101.

As illustrated in FIG. 2B, the CCD camera 100 is fitted into a rectangular opening 12 formed in a back surface 11 of the camera housing 10. Claws 13 are formed beside the opening 12. The claws 13 are disposed at opposite corners of the opening 12 to hold the CCD camera 100 fitted into the opening 12. The number and the shape of the claws 13 are not limited to those illustrated in FIGS. 2B and 2C, and any other parts that can fix the CCD camera 100 to the camera housing 10 may be used.

The lens 101 is placed in a circular opening 14 at the front side of the camera housing 10 and is fixed by a screw cap 15. A screw thread 14A for receiving the screw cap 15 is formed in the opening 14.

Screw holes 16 are provided near the four corners of the opening 12 of the back surface 11 to receive screws (see FIGS. 4A and 48) for attaching the board 103 to the back surface 11, and screw holes 17 are provided at the four corners of the back surface 11 to receive screws (see FIG. 5C) for attaching the board housing 20 to the back surface 11 of the camera housing 10.

For example, the camera housing 10 is molded from a resin. The back surface 11, the opening 12, the claws 13, the opening 14, the screw thread 14A, the screw holes 16, and the screw holes 17 may also be formed in the molding process.

As described above, the CCD camera 100 of the camera module 1 of the first embodiment is fixed to the camera housing 10 by fitting it into the opening 12. Also, the lens 101 is fixed to the camera housing 10 by fitting it into the opening 14.

Figure 3A:
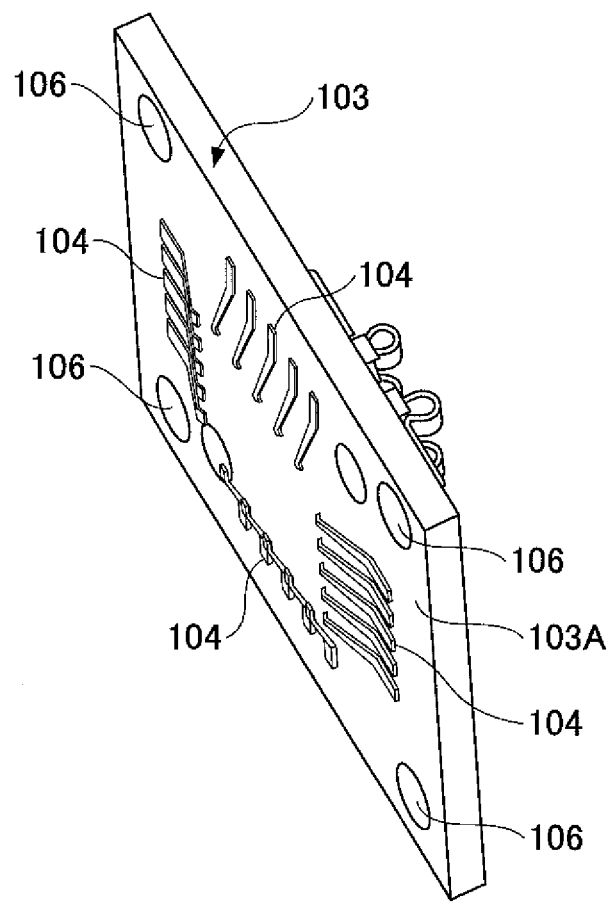
FIGS. 3A and 3B are drawings illustrating an IC 102 for driving a CCD camera 100 and a board 103 on which the IC 102 is mounted.
Figure 3B:
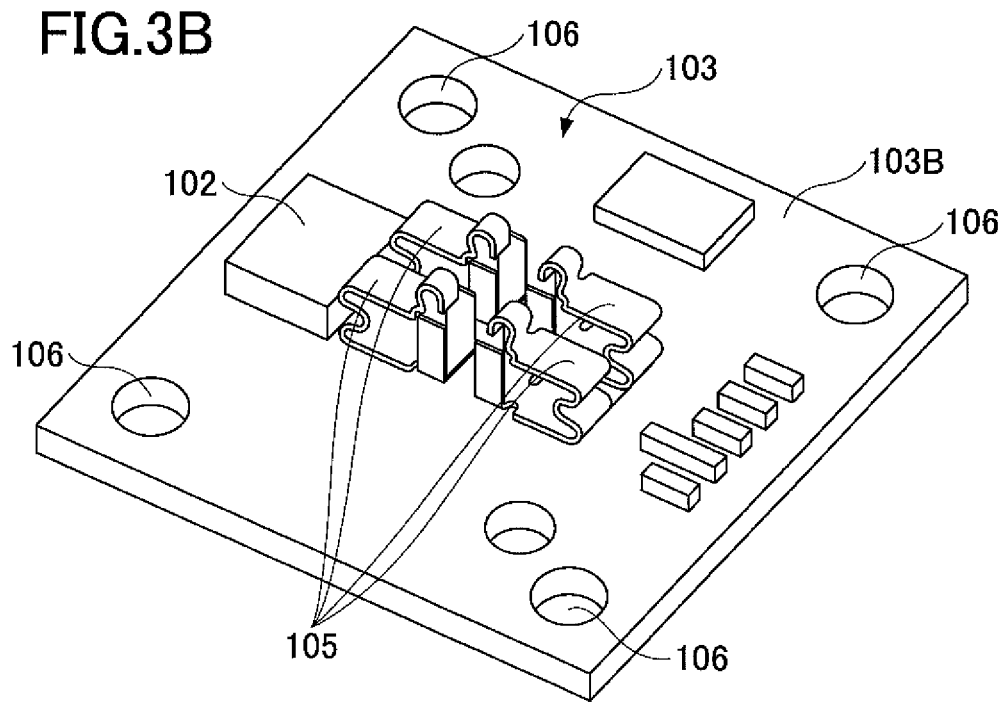

FIGS. 3A and 3B are drawings illustrating an integrated circuit (IC) 102 used as a driving unit for driving the CCD camera 100 and the board 103 on which the IC 102 is mounted.

The board 103 is, for example, a printed circuit board (PCB).

According to one exemplary embodiment, leads 104 are arranged in a rectangular pattern on a front surface 103A (the surface to be brought into contact with the CCD camera 100) of the board 103. For illustration purposes only, five leads 104 are arranged on each side of the rectangular pattern and 20 leads are provided in total. The leads 104 may be elastic parts shaped like flat springs and used as camera-side connecting parts for connecting terminals of the CCD camera 100 with wiring on the front surface 103A of the board 103. The leads 104 may be made of, for example, copper or a copper alloy and may be directly or indirectly attached to the front surface 103A of the board 103.

The IC 102 is mounted on a back surface 103B of the board 103. According to another exemplary embodiment, four spring terminals 105 may be attached to the back surface 103B. The spring terminals 105 may be elastic parts shaped like flat springs and used as cable-side connecting parts for connecting terminals of the cable 30 with wiring on the back surface 103B of the board 103. The spring terminals 105 may be made of, for example, copper or a copper alloy and may be directly or indirectly attached to the back surface 103B of the board 103.

The IC 102, the leads 104, and the spring terminals 105 may be electrically connected with each other via the wiring formed on the front surface 103A, the wiring formed on the back surface 103B, and/or internal wiring formed in the board 103. For brevity, the wiring is omitted in the drawings.

Screw holes 106 are formed at the four corners of the board 103. Screws (see FIGS. 4A and 4B) are inserted into the screw holes 106 to fix the board 103 to the camera housing 10.

Figure 4A:
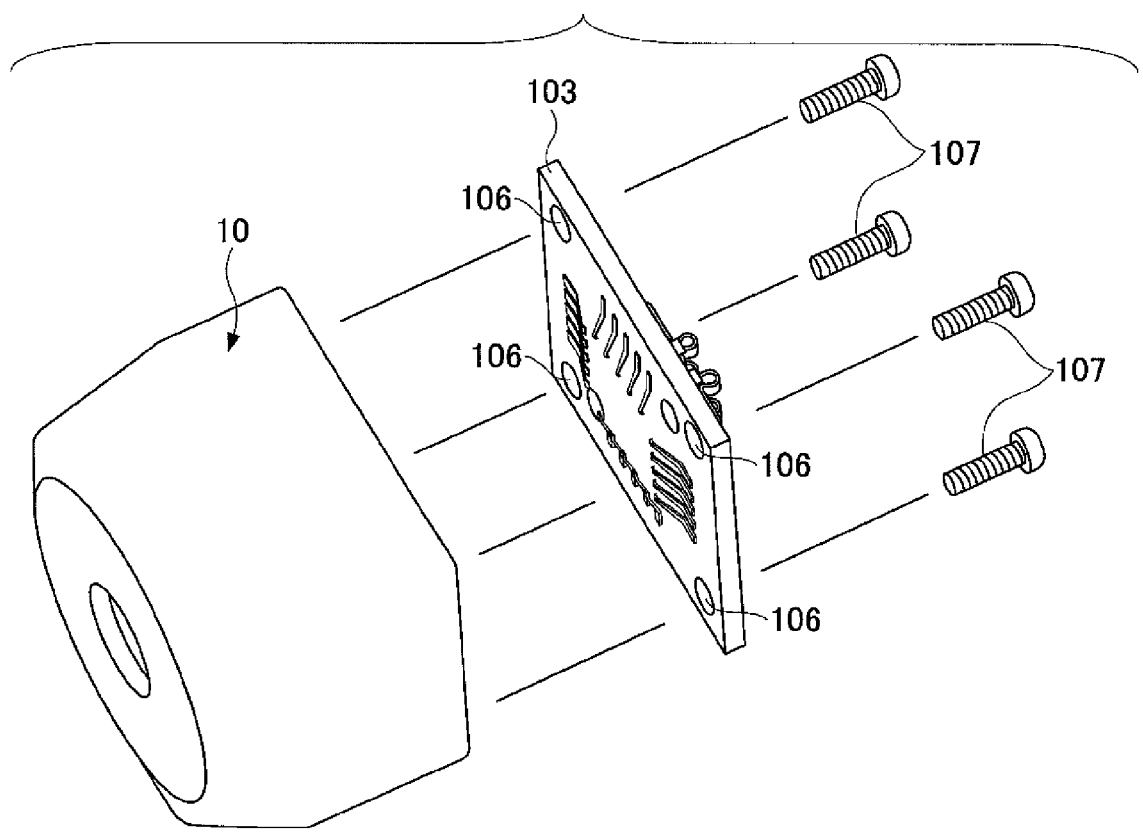
FIGS. 4A and 4B are drawings illustrating components for fixing the board 103 to the camera housing 10.
Figure 4B:
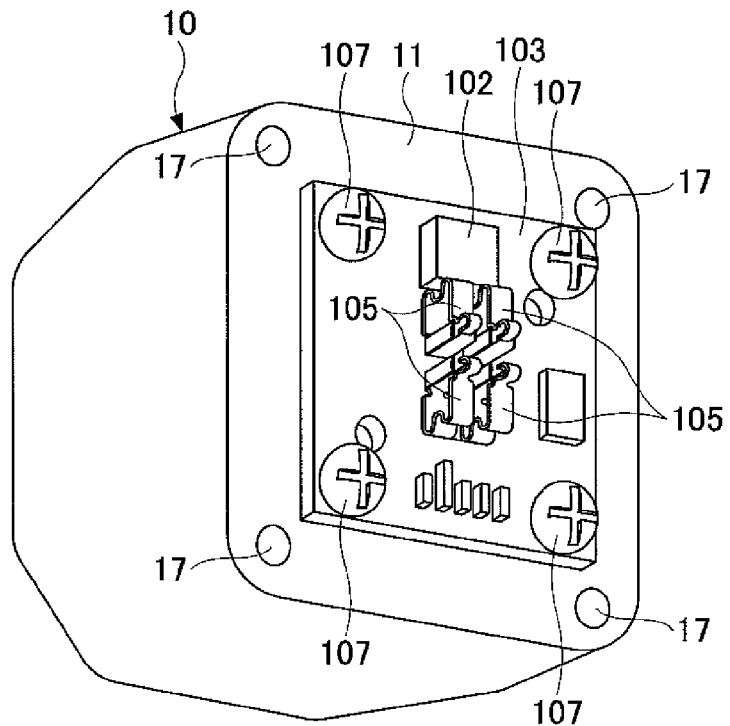

FIGS. 4A and 4B illustrate components used for fixing the board 103 to the camera housing 10.

For example, screws 107 may be inserted into the screw holes 106 and screwed into the screw holes 16 of the camera housing 10 as illustrated in FIG. 4A to fix the board 103 to the camera housing 10 as illustrated in FIG. 42.

In this embodiment, the board 103 fixed with the screws 107 to the camera housing 10 is not housed in the camera housing 10 and protrudes from the back surface 11. Alternatively, the board 103 may be housed in the camera housing 10.

Figure 5A:
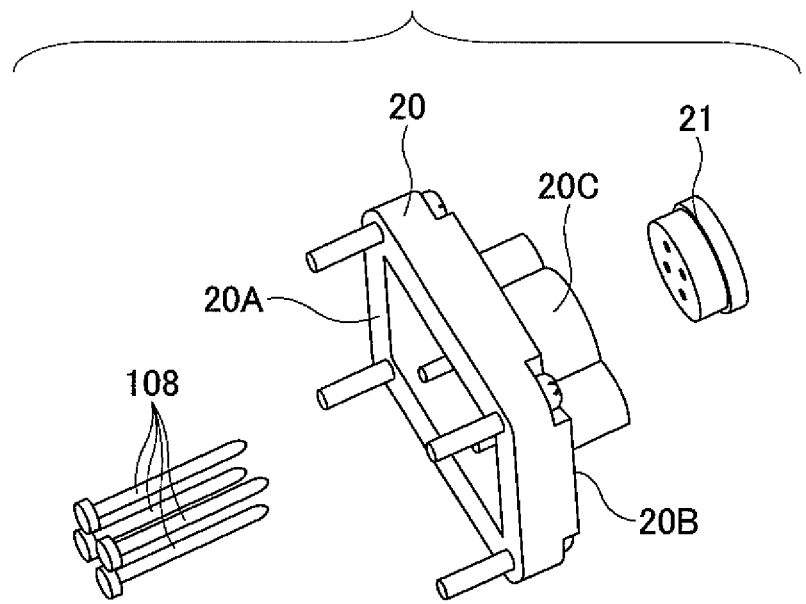
FIGS. 5A through 5C are drawings illustrating a board housing 20 and components for attaching the board housing 20 to the camera housing 10.
Figure 5B:
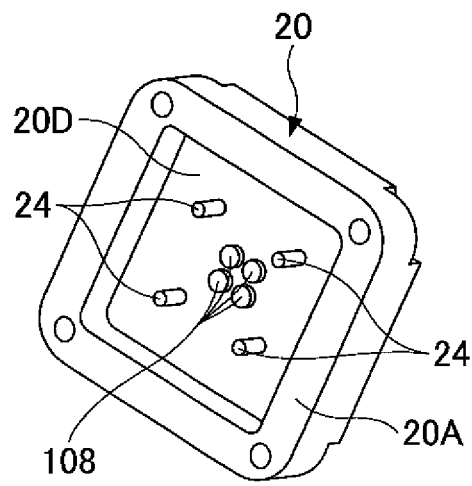
Figure 5C:
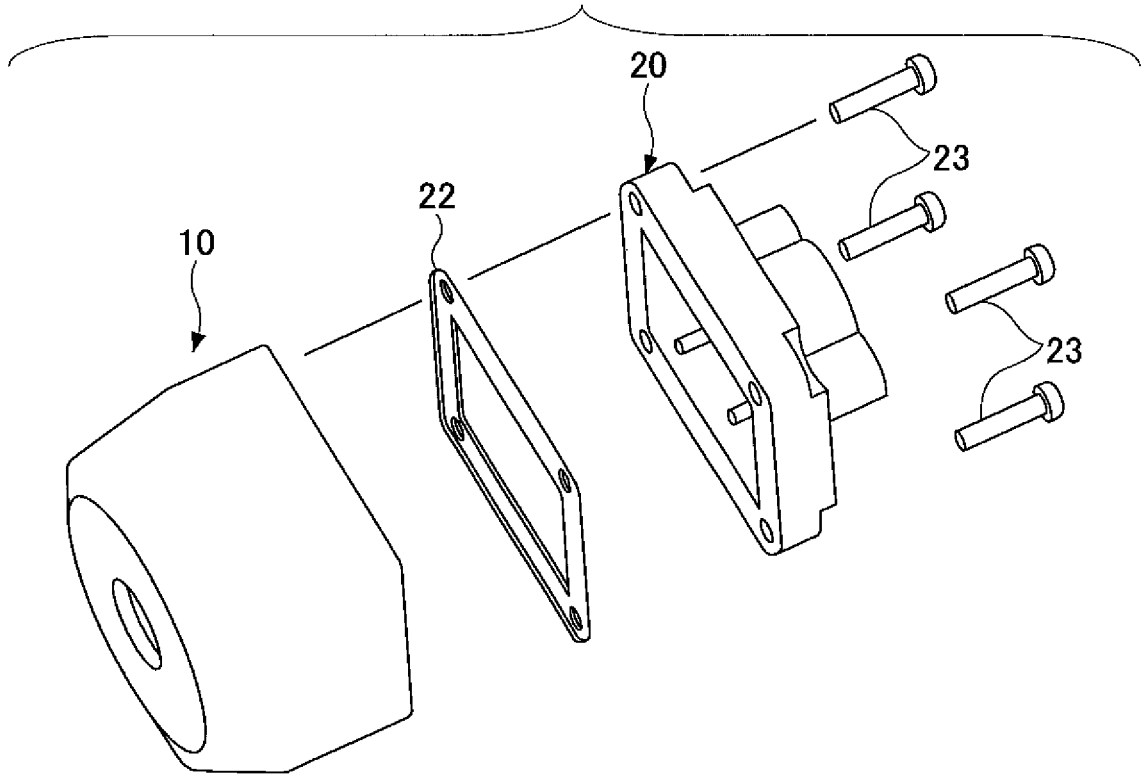

FIGS. 5A through 5C illustrate components for attaching the board housing 20 to the camera housing 10.

As illustrated in FIG. 5A, the board housing 20 has a front surface 20A and a back surface 20B. Pins 108 may be inserted into openings (not shown) of the board housing 20 from the front surface 20A. A gasket (or packing) 21 is fitted into the board housing 20 from the back surface 20B via a receiving part 20C. According to one embodiment, the head of each of the pins 108 may have a diameter greater than that of its shank and the head of the pins 108 engages the board housing 20. FIG. 5B illustrates the board housing 20 with the pins 108 inserted.

The board housing 20 may be fixed by screws 23 to the camera housing 10. A gasket (or packing) 22 is placed between the board housing 20 and the camera housing 10. The screws 23 are screwed into the screw holes 17 (see FIGS. 2B and 2C) formed in the back surface 11 of the camera housing 10.

The receiving part 20C is provided to receive a jack insulating part 32 (see FIGS. 6B and 6C) of the cable 30 and is formed on the back surface 20B of the board housing 20. Protrusions 24 may be formed on a bottom 20D of the board housing 20 to hold the board 103.

Figure 6A:
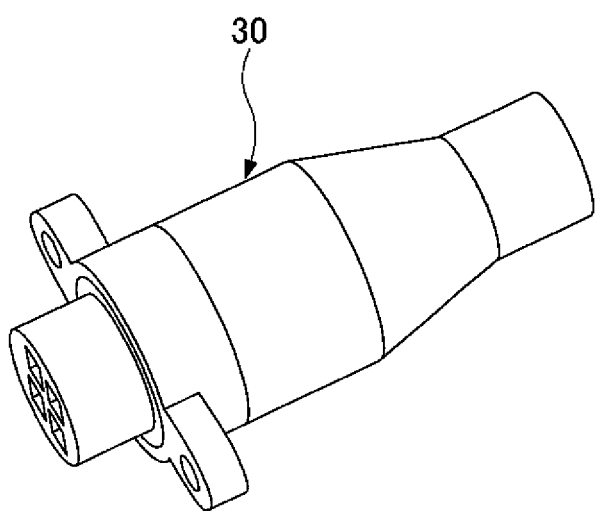
FIGS. 6A through 6C are drawings illustrating a cable 30.
Figure 6B:
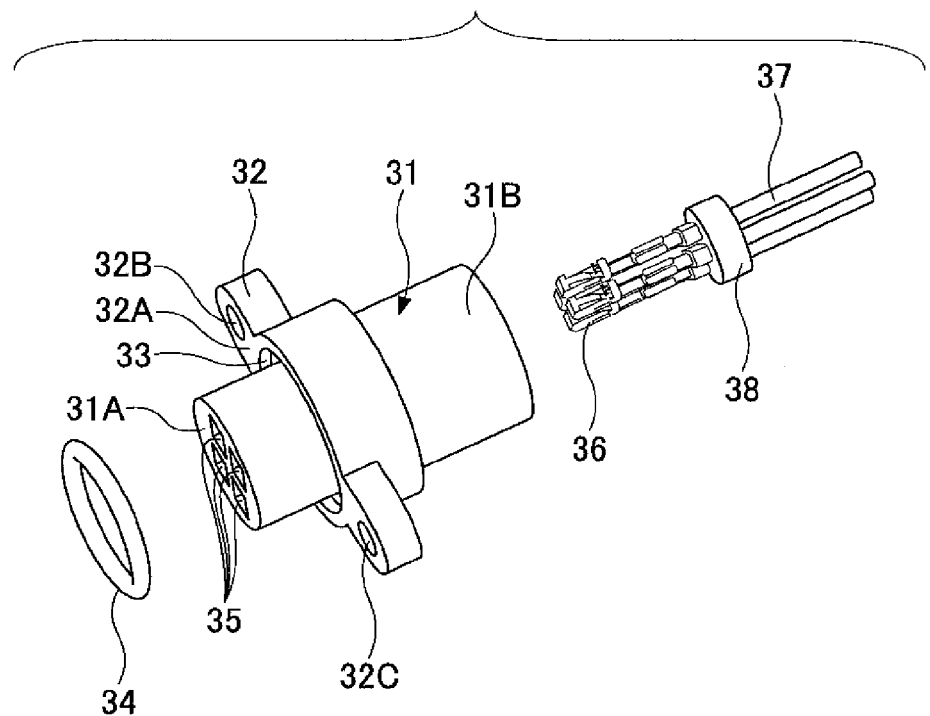
Figure 6C:
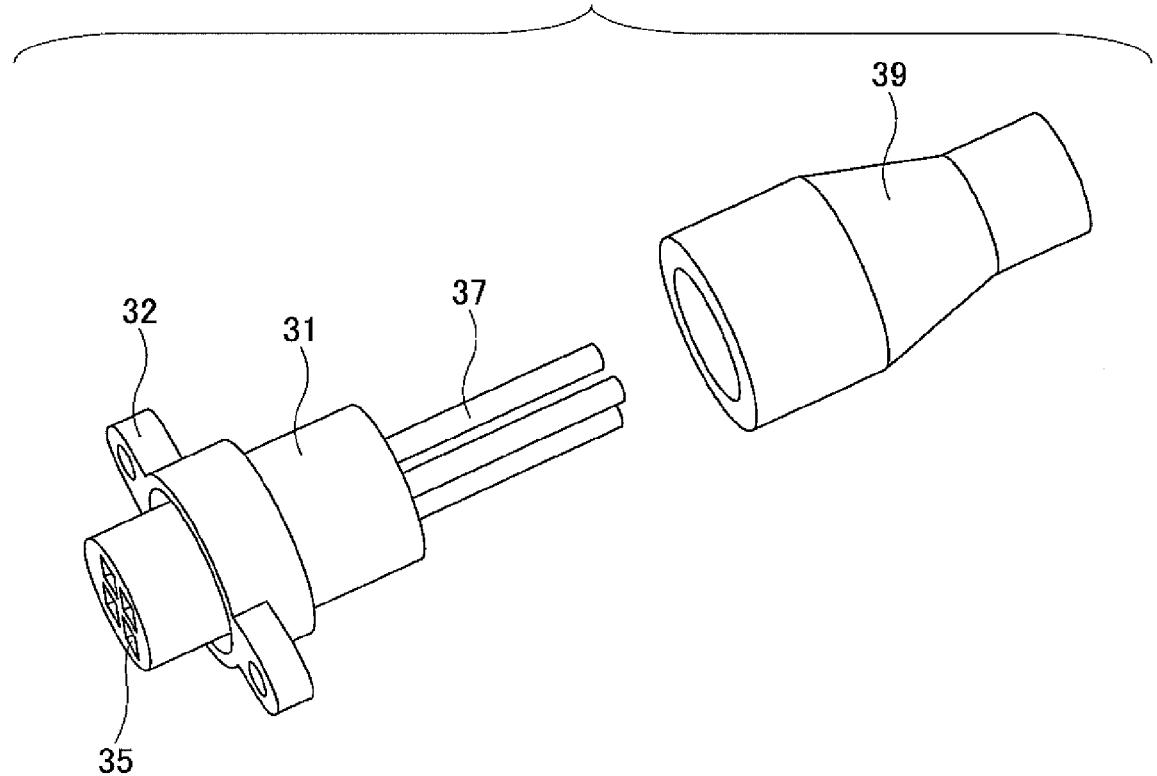

FIGS. 6A through 6C are drawings illustrating the cable 30.

As illustrated in FIGS. 6A through 6C, the cable 30 may include a cylindrical cover 31. The jack insulating part 32 is provided on the outer surface of the cover 31. The cover 31 and the jack insulating part 32 may be formed as a monolithic part. A ring-shaped groove 33 may be formed in a surface 32A of the jack insulating part 32. A ring-shaped gasket (or packing) 34 may be fitted into the groove 33. Also openings 32B and 32C may be formed in the jack insulating part 32.

Openings 35 may be formed in the cover 31. The openings 35 extend from a first end 31A to a second end 31B of the cover 31.

An opening (not shown) communicating with the openings 35 is formed at the second end 31B of the cover 31. Wires 37 with jack contacts 36 attached to their ends are inserted through the opening into the openings 35, and a gasket (or packing) 38 attached to the wires 37 is fitted into the opening at the second end 31B. Accordingly, the jack contacts 36 are placed in the corresponding openings 35. The jack contacts 36 are to be connected with the pins 108 (see FIG. 5B).

With the jack contacts 36 placed in the openings 35 and the gasket 38 fitted into the cover 31, an outer cover 39 is formed by insert molding to cover a part of the outer surface of the cover 31 and the wires 37. The resulting cable 30 is illustrated by FIG. 6A.

Figure 7A:
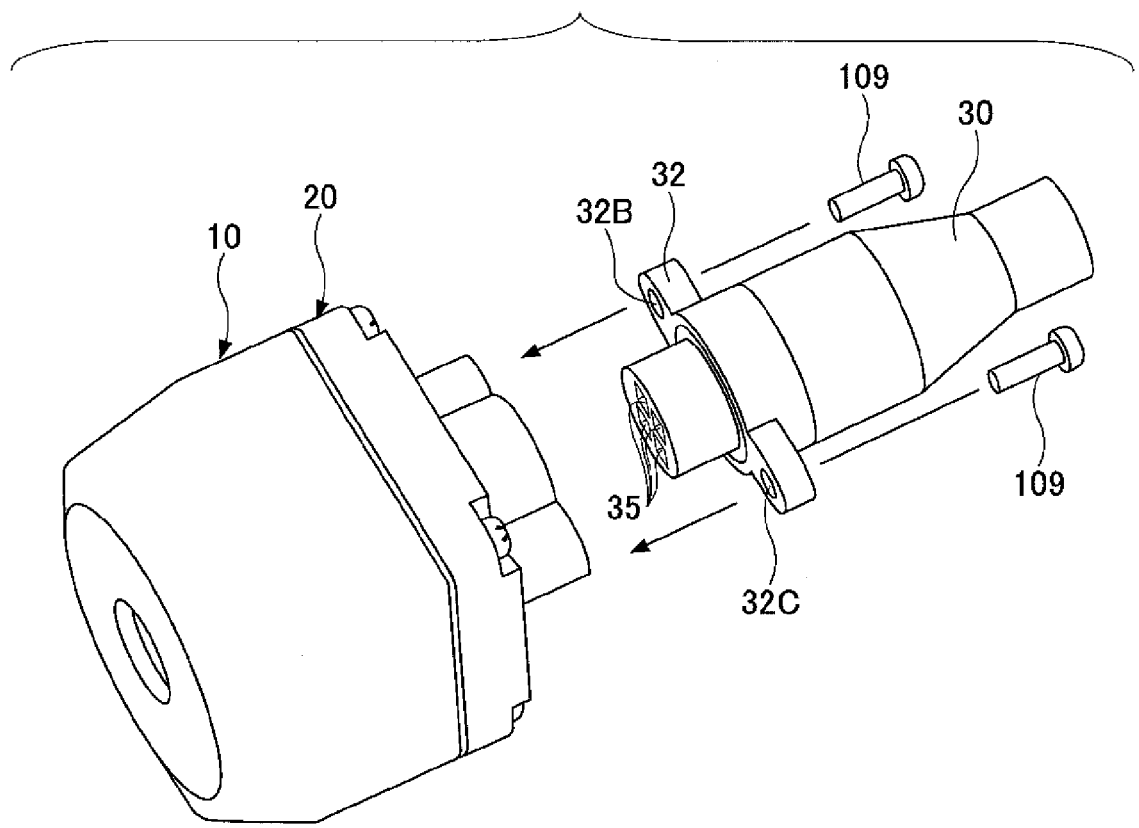
FIGS. 7A and 7B are drawings illustrating components for attaching the cable 30 to the board housing 20.
Figure 7B:
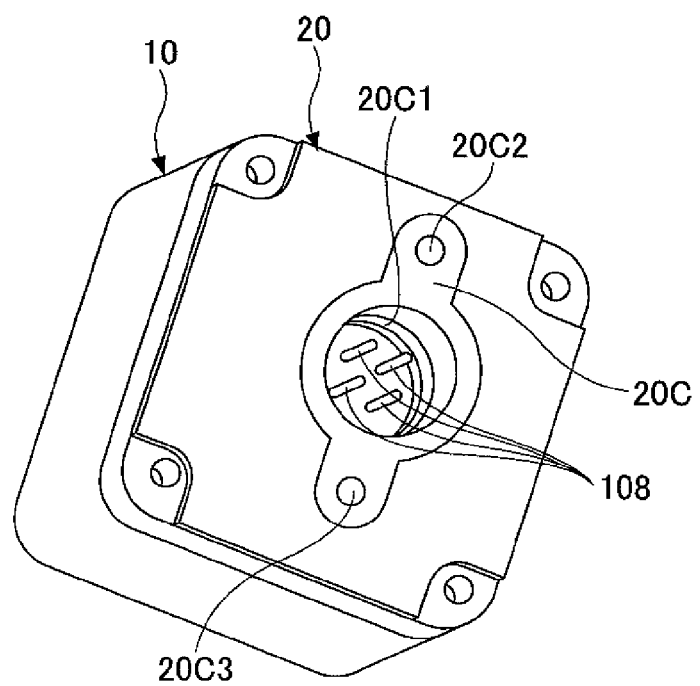

FIGS. 7A and 7B are drawings illustrating components for attaching the cable 30 to the board housing 20.

As illustrated in FIG. 7A, after joining the camera housing 10 and the board housing 20, the cable is screwed to the board housing 20. More specifically, screws 109 may be inserted into the openings 32B and 32C of the jack insulating part 32 and screwed into openings 20C2 and 20C3 (see FIG. 7B) formed in the receiving part 20C of the board housing 20.

In this process, the jack contacts 36 in the openings 35 of the cable 30 are connected with the pins 108 protruding in an opening 20C of the receiving part 20C illustrated in FIG. 7B.

The camera module 100 of the first embodiment is manufactured through the processes as described above.

According to the first embodiment, the CCD camera 100 is fitted into the camera housing 10. Therefore, the accuracy of the optical axis of the CCD camera 100 is determined by the manufacturing accuracy of the camera housing 10 that is manufactured, for example, by molding.

In a related-art camera module, a CCD camera is mounted on a board and the board is screwed or bonded to a lens housing. Accordingly, the accuracy of the optical axis of the CCD camera is influenced by the accuracy of fixing the board to the lens housing. For example, when four screws are used to fix the board to the lens housing, the optical axis of the CCD camera may be shifted greatly depending on the torque applied to the screws. Such a problem may also occur when the board is bonded to the lens housing.

Meanwhile, in the first embodiment, the CCD camera 100 is fitted into the camera housing 10 and the accuracy of the optical axis of the CCD camera 100 is determined by the manufacturing accuracy of the camera housing 10. This configuration makes it possible to manufacture a camera module with an accurate optical axis that is close to a designed value.

Also in the first embodiment, the board 103 and the CCD camera 100 are connected via the leads 104 made of elastic parts. This configuration makes it easier to manufacture a camera module.

Similarly, the board 103 and the pins 108 are connected via the spring terminals 105 made of elastic parts. This configuration also makes it easier to manufacture a camera module.

In the related art, a board and a CCD camera and/or a cable are electrically connected by soldering or brazing. Accordingly, the related-art configuration increases the manufacturing steps and the manufacturing costs of a camera module.

Meanwhile, using the leads 104 and the spring terminals 105 makes it possible to eliminate the soldering or brazing step, to simplify the configuration of the camera module 1, and to reduce the costs of the camera module 1 without reducing the reliability of the electric connection between the CCD camera 100, the board 103, and the cable 30.

Further in the first embodiment, the gaskets 21, 22, 34, and 38 are provided between the camera housing 10, the board housing 20, and the cable 30 that are joined together with screws. Thus, the camera module 1 of the first embodiment is waterproof and is suitable for an on-vehicle camera module for viewing an area behind or on a side of a vehicle.

The shapes of the leads 104 connecting the CCD camera 100 and the board 103 and the spring terminals 105 connecting the board 103 and the pins 108 are not limited to those described in the first embodiment, and any other elastic connecting parts may be used instead of the leads 104 and the spring terminals 105.

<Second Embodiment>

In a camera module 1 of a second embodiment, the spring terminals 105 of the camera module 1 of the first embodiment may be replaced with spring terminals 205. Other components of the camera module 1 of the second embodiment are substantially the same as those of the camera module 1 of the first embodiment. Therefore, the same reference numbers are assigned to those components and their descriptions are omitted here.

Figure 8A:
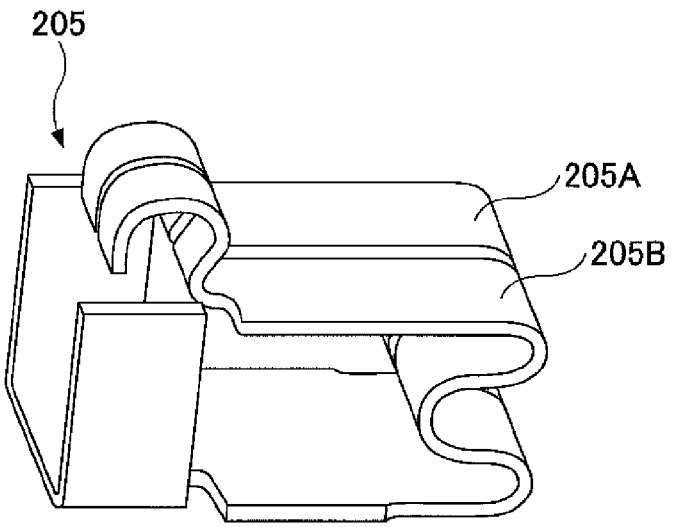
FIGS. 8A and 8B are drawings illustrating spring terminals of a camera module 1 according to a second embodiment.
Figure 8B:
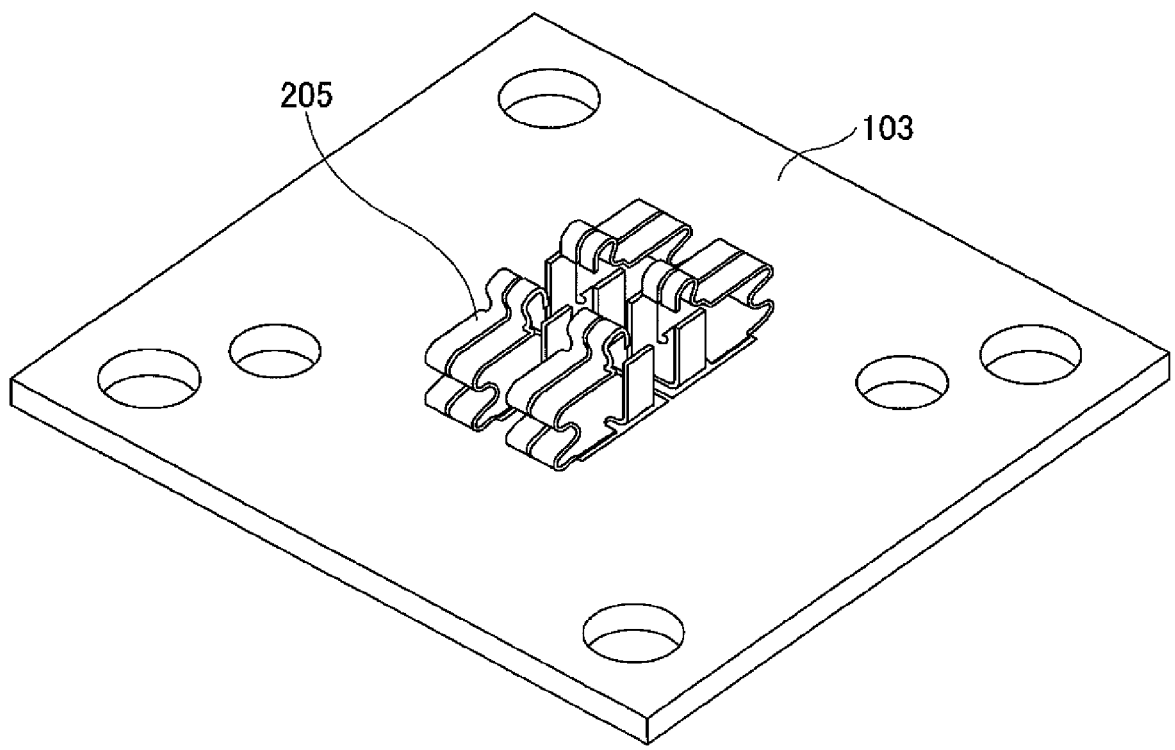

FIGS. 8A and 8B are drawings illustrating the spring terminals 205 of the camera module 1 of the second embodiment.

As illustrated in FIG. 8A, a contact part, which is to be brought into contact with the pin 108, of the spring terminal 205 is divided into two contact parts 205A and 205B. FIG. 8B illustrates the spring terminals 205 mounted on the board 103.

With this configuration, even if one of the contact parts 205A and 2052 is damaged or broken, the electric connection is maintained by the other one of the contact parts 205A and 205B. This configuration is preferable to improve the reliability of a camera module that is to be mounted, for example, on a vehicle where the camera module is subject to intermittent vibrations.

Figure 9A:
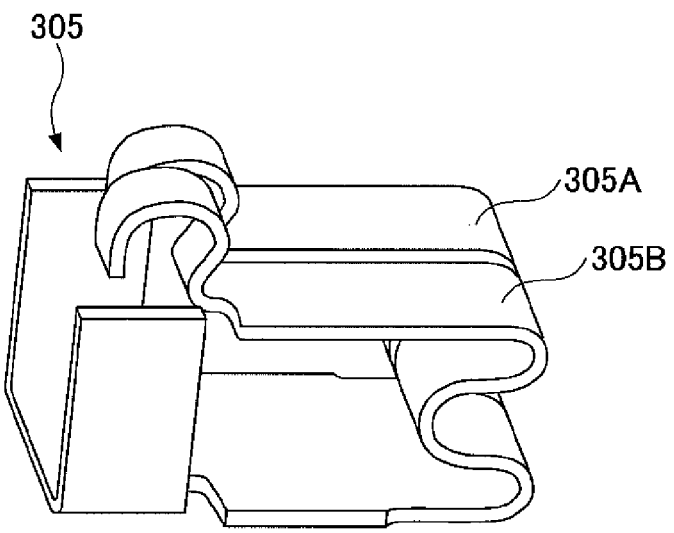
FIGS. 9A and 9B are drawings illustrating spring terminals of the camera module 1 according to a variation of the second embodiment.
Figure 9B:
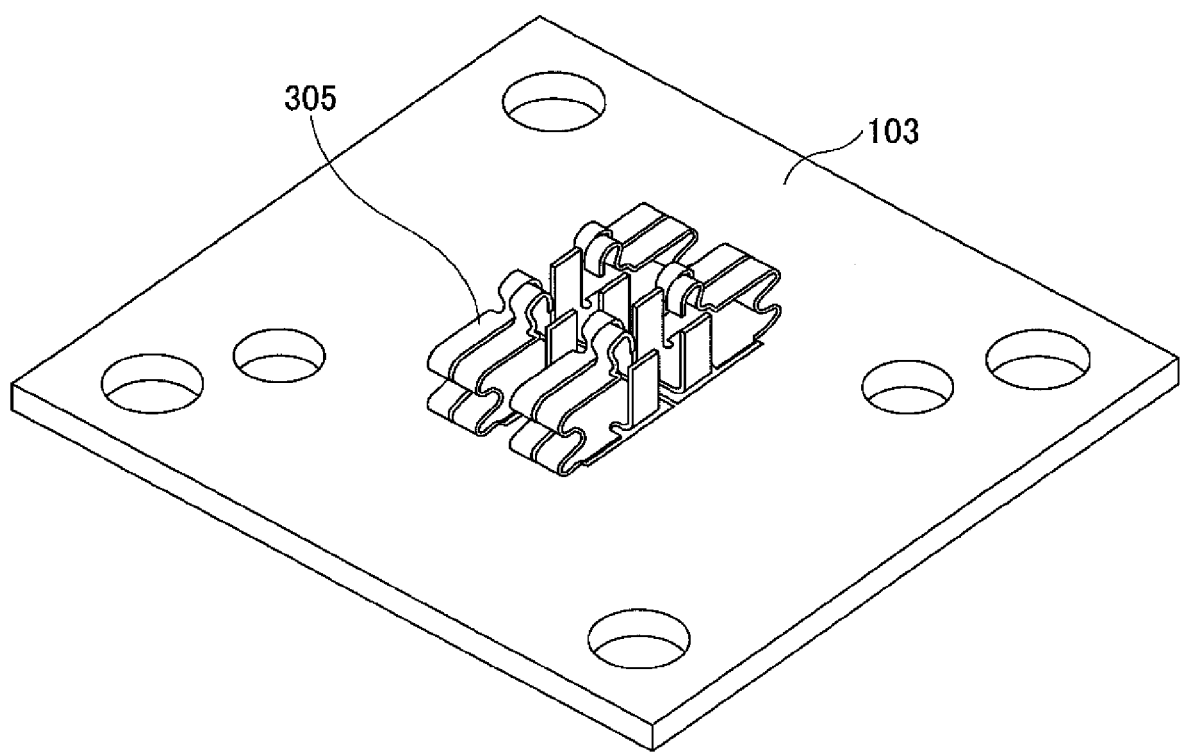

FIGS. 9A and 9B are drawings illustrating spring terminals 305 of the camera module 1 according to a variation of the second embodiment.

The spring terminal 305 includes contact parts 305A and 305B having different lengths. This configuration gives different spring constants and different resonance frequencies to the contact parts 305A and 305B.

Take, for example, a case where a camera module is mounted on a vehicle and subject to intermittent vibrations. The frequency of vibration varies depending on the type of the vehicle, the driving conditions, and the traveling speed.

With the configuration of the spring terminal 305, even if one of the contact parts 305A and 305B resonates in a certain circumstance, the other one of the contact parts 305A and 305E does not resonate. Thus, this configuration makes it possible to reliably maintain the electric connection in various circumstances.

<Third Embodiment>

According to a third embodiment of the present invention, pressed parts are prepared by pressing or punching a metal plate, e.g., a hoop material, and holders are formed by insert molding to produce multiple camera modules. Then, the camera modules are separated by cutting off the pressed parts from carriers of the metal plate.

Figure 10:
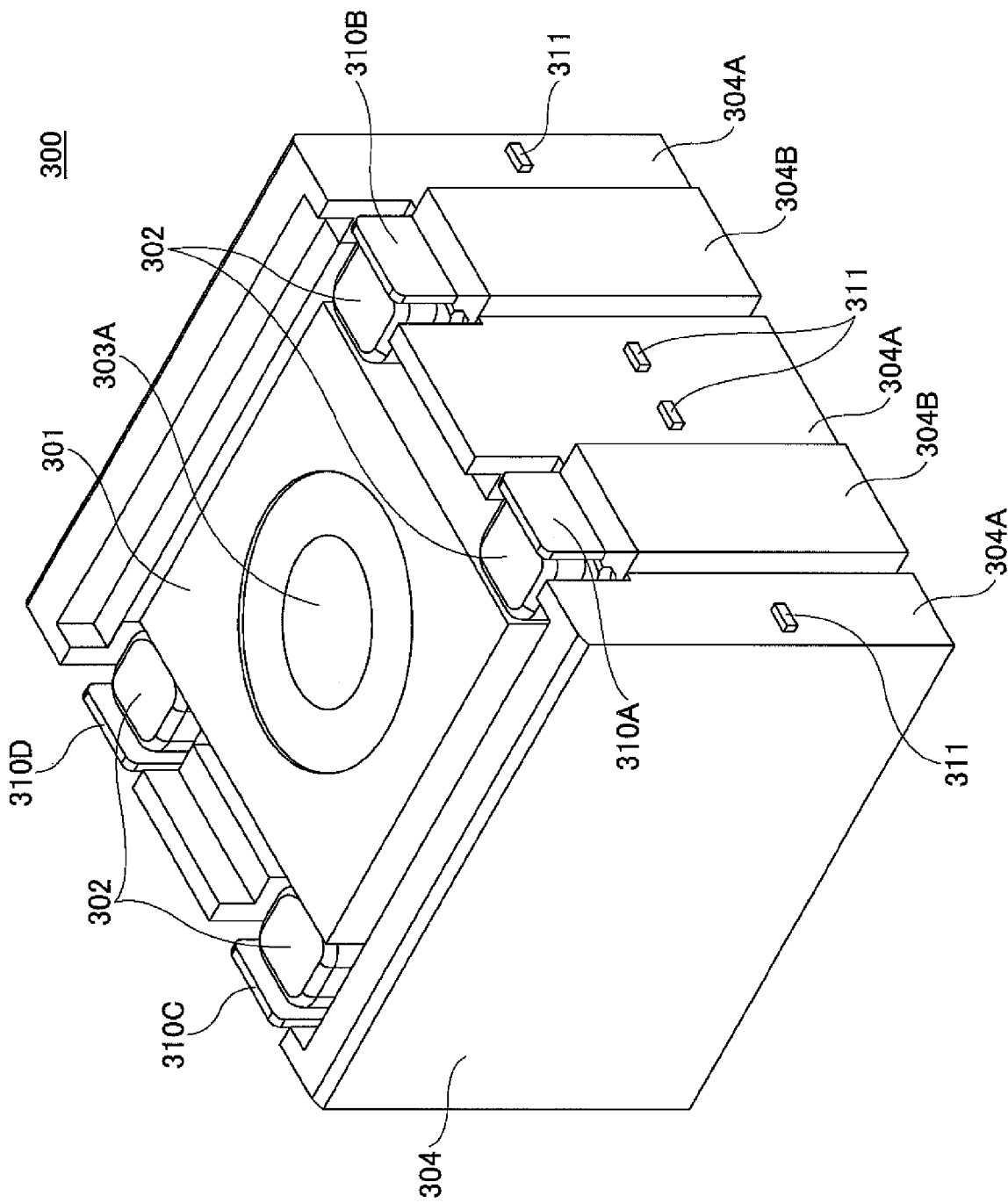
FIG. 10 is a perspective view of a camera module 300 according to a third embodiment.
Figure 11:
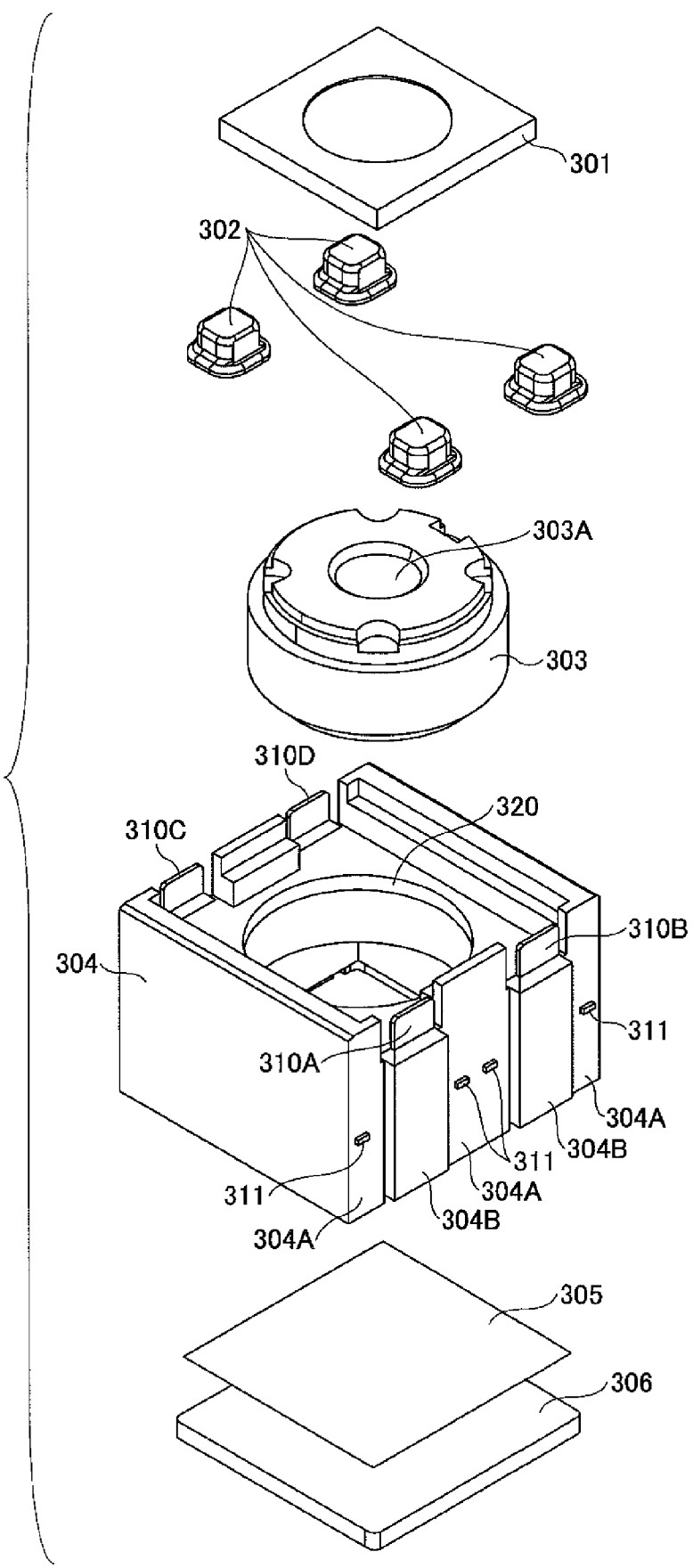
FIG. 11 is an exploded perspective view of the camera module 300.

FIG. 10 is a perspective view of a camera module 300 of the third embodiment, and FIG. 11 is an exploded perspective view of the camera module 300. In the descriptions below, a "lower surface" indicates a surface of a component that is closer to the bottom of the printed page and an "upper surface" indicates a surface of a component that is closer to the top of the printed page.

As illustrated in FIGS. 10 and 11, the camera module 300 includes an autofocus part 301, conductive adhesives 302, a lens barrel 303, a holder 304, an infrared (IR) cut film 305, an image sensor 306, and terminals 310A, 310B, 310C, and 310D.

The autofocus part 301 focuses the camera module 300 using, for example, deformation of a piezoelectric element.

The conductive adhesives 302 connect terminals (not shown) on a lower surface of the autofocus part 301 with the terminals 310A through 310D. The conductive adhesives 302 may be made of, for example, a material including a thermosetting resin used as a binder and silver or copper particles used as conductive fillers. When the binder is thermally cured, the terminals on the lower surface of the autofocus part 301 are connected with the terminals 310A through 310D.

The lens barrel 303 is a barrel-shaped part for housing a lens 303A.

The holder 304 is formed by insert molding using the terminals 310A through 310D as inserts (i.e., to surround and hold the terminals 310A through 310D), and is made of, for example, a thermosetting resin. The terminals 310A through 310D extend vertically in the holder 304. Cut-off parts 311 that are parts of the terminals 310A through 310D penetrate through a wall of the holder 304 and protrude from an outer surface 304A of the wall. The holder 304 includes raised parts 304B on the outer surface 304A. The raised parts 304B protrude to such an extent as to exceed the ends of the cut-off parts 311 protruding from the outer surface 304A. In other words, the degree of protrusion of the raised parts 304B is greater than that of the cut-off parts 311. Still in other words, the cut-off parts 311 are located in recesses formed in the outer surface 304A.

The holder 304 has a through hole 320 for housing the lens barrel 303. Details of the holder 304, the terminals 310A through 310D, the cut-off parts 311, and the through hole 320 are described later with reference to FIGS. 12A through 12C, 15A, and 15B.

The IR cut film 305 is provided between the lens barrel 303 and the image sensor 306. For example, the IR cut film 305 is placed on the image sensor 306 to cover an incidence plane (the upper surface) of the image sensor 306.

The image sensor 306 is, for example, implemented by a charge coupled device (CCD) image sensor or a complementary metal oxide semiconductor (CMOS) image sensor. The number of pixels of the image sensor 306 may be determined freely to achieve a desired resolution. For example, the number of pixels of the image sensor 306 may be set at six million or ten million.

Parts of the terminals 310A through 310D protruding upward from the holder 304 in FIGS. 10 and 11 are connected with the conductive adhesives 302. The terminals 310A through 310D extend downward (in FIGS. 10 and 11) through the holder 304 and include the cut-off parts 311 that protrude from the outer surface 304A of the wall of the holder 304.

Figure 12A:
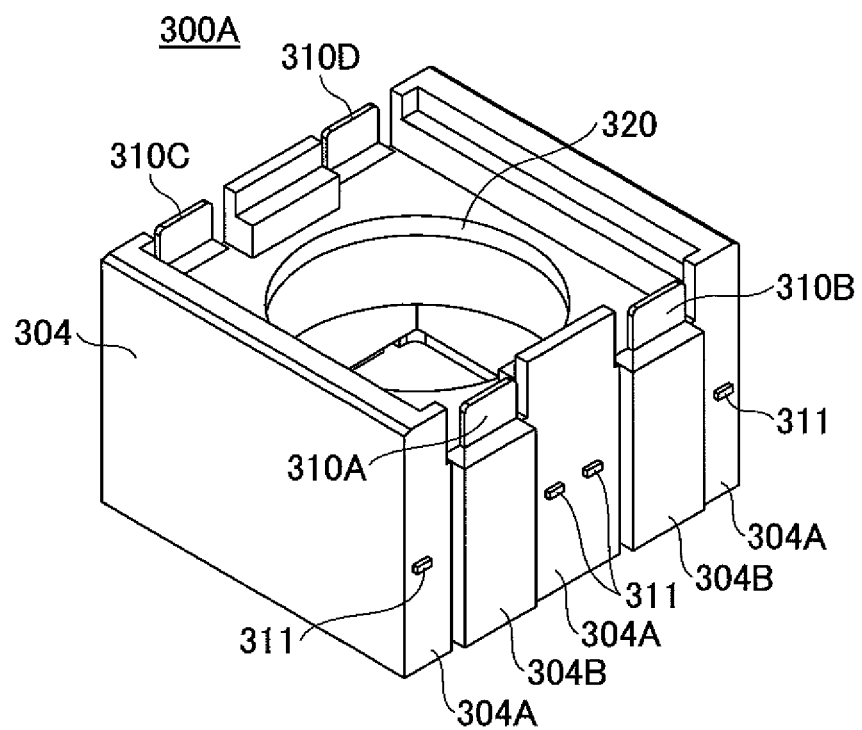

FIGS. 12A through 12C are drawings illustrating a module 300A including the holder 304 and the terminals 310A through 310D. FIG. 12A is a perspective view of the module 300A, FIG. 123 is an exploded perspective view of the module 300A, and FIG. 12C is a side view of the terminal 310A seen from a direction indicated by an arrow A in FIG. 12B.

The module 300A includes the holder 304 and the terminals 310A through 310D. The holder 304 is formed by insert molding using the terminals 310A through 310D as inserts.

In FIG. 12B, for descriptive purposes, the terminals 310A through 310D are separated from the holder 304. In practice, however, the holder 304 is formed by insert molding using the terminals 310A through 310D as inserts, and therefore the holder 304 and the terminals 310A through 310D are integrated.

In the following descriptions, the terminals 310A through 310D may be collectively called the terminals 310.

As illustrated in FIGS. 12B and 12C, each of the terminals 310A through 310D includes a first end 312A, a second end 312B, and the cut-off parts 311.

The first end 312A protrudes upward from the holder 304 as illustrated in FIGS. 10, 11, and 12A and is connected with the conductive adhesive 302.

Figure 14:
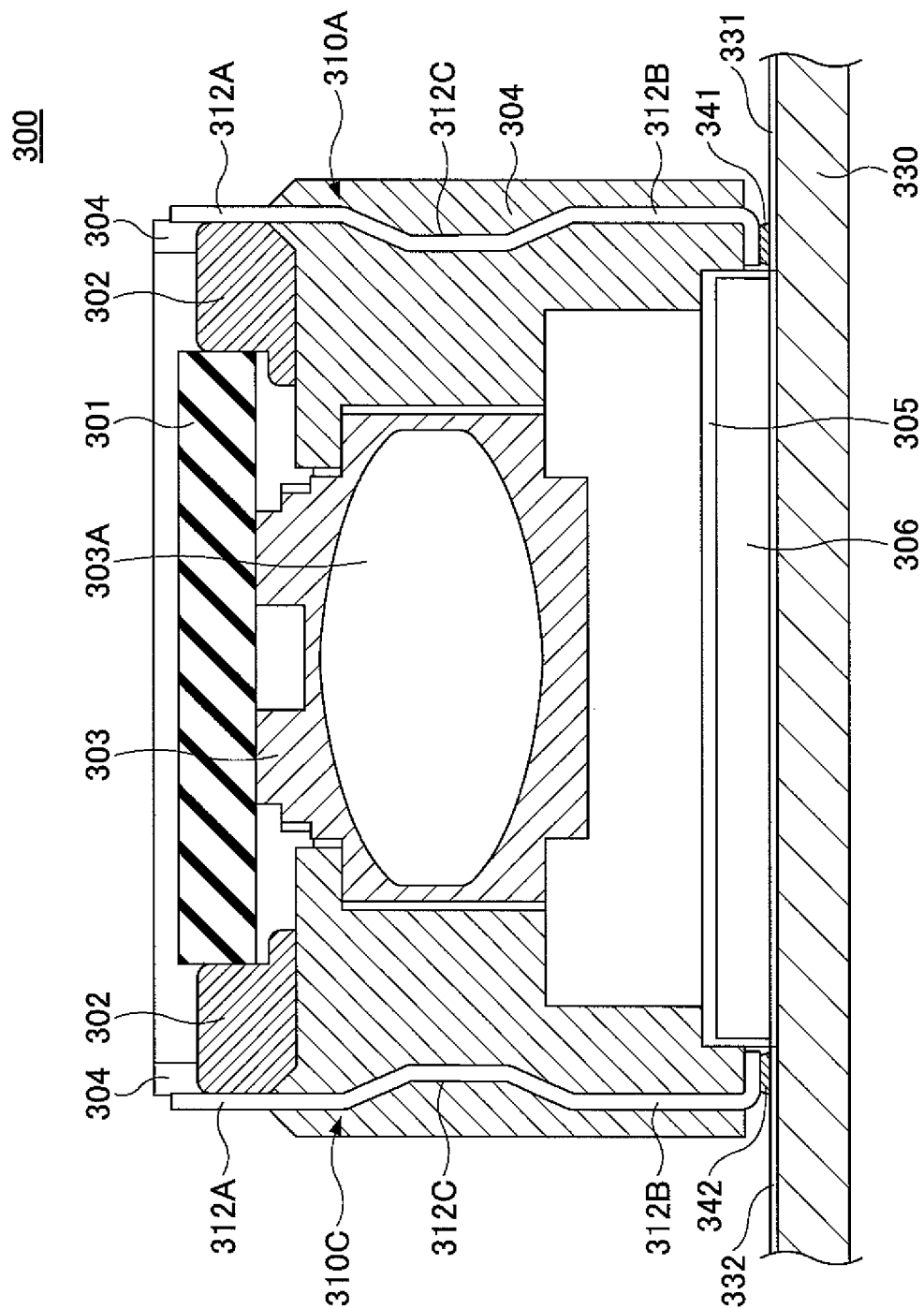
FIG. 14 is cross-sectional view of the camera module 300 taken along line B-B' in FIG. 13A.

The second end 312B is an end opposite to the first end 312A and is connected with a board 330 (see FIG. 14).

In FIGS. 123, X1 and X2 directions that are opposite to each other are indicated by an X axis, Y1 and Y2 directions that are opposite to each other are indicated by a Y axis, and Z1 and Z2 directions that are opposite to each other are indicated by a Z axis.

Since the terminals 310A through 310D have substantially the same configuration, the terminal 310A is used as a representative in the descriptions below.

As illustrated in FIGS. 12B and 12C, the first end 312A of the terminal 310A extends from a middle part 312C in the Y1 direction, and the second end 312A extends from the middle part 312C in the Y2 direction. The first end 312A and the second end 312B are offset in the Z1 (or Z2) direction with respect to the middle part 312C. In other words, the first end 312A and the second end 312B are bent in the Z1 (or Z2) direction by pressing.

The cut-off parts 311, respectively, extend in the X1 and X2 directions from the middle part 312C, extend in the Y2 direction, and then extend in the Z1 (or Z2) direction.

The terminals 310A through 310D are prepared by pressing or punching a metal plate such as a hoop material. After the holder 304 is formed by insert molding, the terminals 310A through 310D are cut off from carriers of the hoop material to separate the holder 304. Accordingly, the cut-off parts 311 correspond to parts that are cut off from the carriers when separating the holder 304 from (the remaining part of) the hoop material.

Figure 13A:
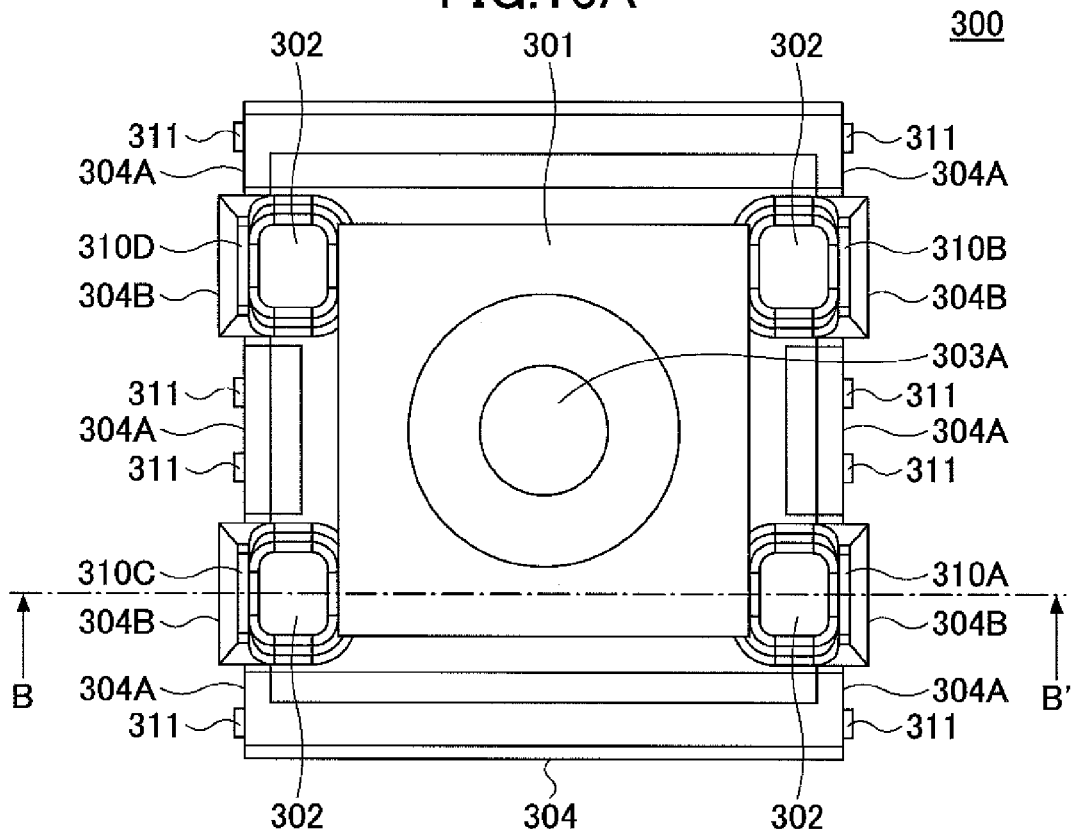
FIG. 13A is a plan view and FIG. 13B is a bottom view of the camera module 300.
Figure 13B:
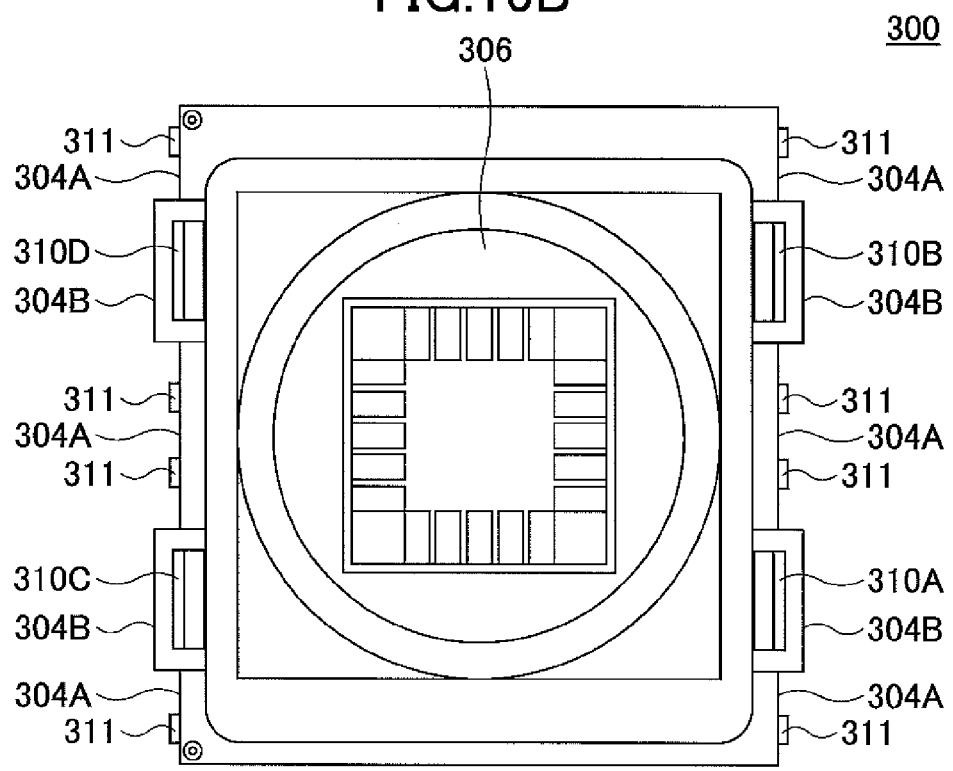

FIG. 13A is a plan view and FIG. 13B is a bottom view of the camera module 300.

In the plan view of FIG. 13A, the autofocus part 301, the conductive adhesives 302, the lens 303A, the holder 304, and the terminals 310A through 310D of the camera module 300 are visible.

In the bottom view of FIG. 13B, the holder 304, the image sensor 306, and the terminals 310A through 310D of the camera module 300 are visible. Similarly to the CCD camera 100 of the first embodiment, the image sensor 306 includes terminals.

FIG. 14 is cross-sectional view of the camera module 300 taken along line B-B' in FIG. 13A.

As illustrated in FIG. 14, the autofocus part 301, the conductive adhesives 302, the lens barrel 303, the IR cut film 305, the image sensor 306, and the terminals 310A through 310D are attached to or held by the holder 304. The image sensor 306 is disposed behind or below the lens 303A.

The first ends 312A of the terminals 310A and 310O (310B and 310D) are connected to the conductive adhesives 302, and the conductive adhesives 302 are connected to terminals of the autofocus part 301.

Also, as illustrated in FIG. 14, the camera module 300 is mounted on the board 330, and the second ends 312B of the terminals 310A and 310C (310B and 310D) are connected via solders 341 and 342 to wires 331 and 332 of the board 330. For example, the solders 341 and 342 may be formed by reflow soldering.

Next, a method of manufacturing the module 300A of the camera module 300 is described with reference to FIGS. 15A and 15B.

Figure 15A:
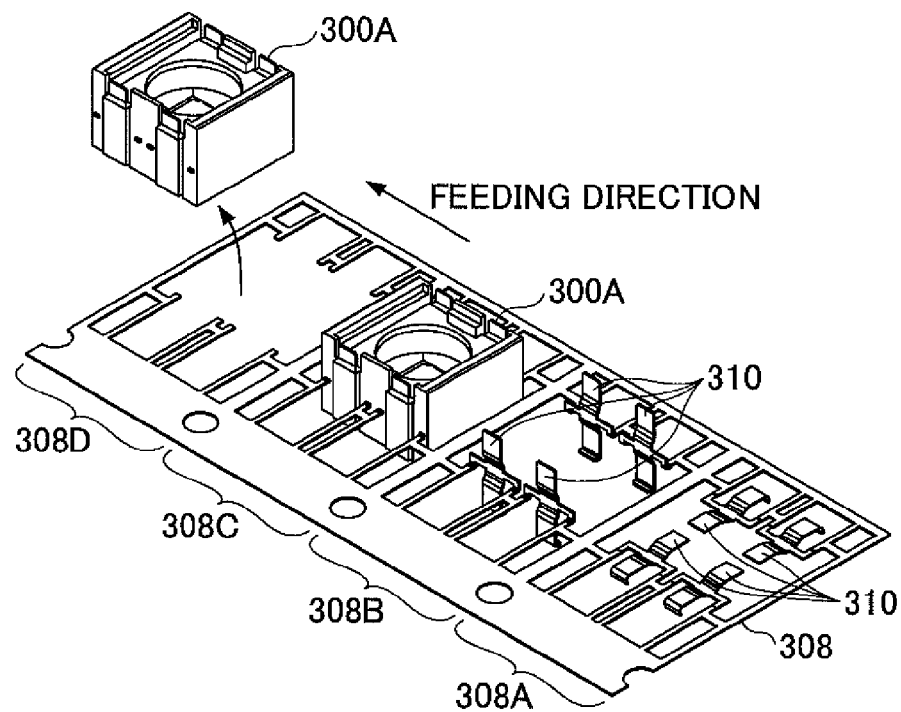
FIGS. 15A and 15B are drawings illustrating components for manufacturing the module 300A of the camera module 300 according to the third embodiment.
Figure 15B:
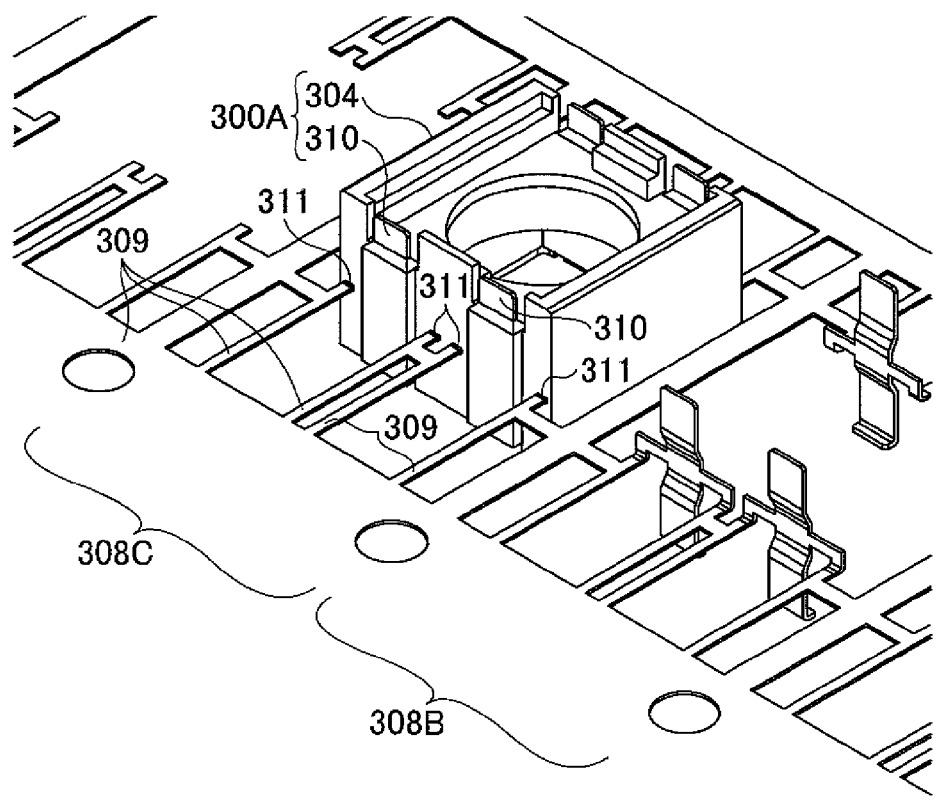

FIGS. 15A and 15B are drawings illustrating components for manufacturing the module 300A of the camera module 300 according to the third embodiment. FIG. 15B is an enlarged view of a part of FIG. 15A.

FIG. 15A illustrates a pressed plate 308 that is formed, for example, by pressing or punching a hoop material made of metal. An arrow in FIG. 15A indicates a feeding direction that corresponds to the length direction of the hoop material.

In the example illustrated in FIG. 15A, four sets of the terminals 310 for four camera modules 300 are formed on the pressed plate 308.

The four sets of the terminals 310 are formed in areas 308A through 308D of the pressed plate 308, respectively. The number of areas, i.e., the number of sets of the terminals 310 formed on the pressed plate 308 is not limited to four. Particularly, when the pressed plate 308 is formed using a hoop material, a large number of areas may be formed on the pressed plate 308.

In FIG. 15A, the areas 308A through 308D represent different steps in the manufacturing process.

In the area 308A, four terminals 310 are formed by pressing or punching, and the first ends 312A and the second ends 312B of the terminals 310 are offset with respect to the middle parts 312C (see FIG. 12B).

In the area 308B, the terminals 310 are pressed such that the middle parts 312B are raised and the first ends 312A and the second ends 312B are placed in upright positions.

In the area 308C, the holder 304 is formed by insert molding using the terminals 310 in the upright positions as inserts. As a result, the module 300A is produced.

At this stage, the module 300A is supported by carriers 309 of the pressed plate 308 as illustrated in FIG. 15B. As illustrated in the area 308D of FIG. 15A, the module 300A is separated from the pressed plate 308. For example, the module 300A is separated from the pressed plate 308 by cutting the carriers 309 with a cutting machine at positions near the holder 304. Alternatively, cut lines or notches may be formed beforehand on the carriers 309 at positions near the holder 304 and the carriers 309 may be cut by applying a pressure.

The cut-off parts 111 remain on the terminals 310 or on the holder 304 after the carriers 309 are cut off from the module 300A. The cut-off parts 111 may be removed, for example, by grinding or polishing.

The terminals 310 in the areas 308A through 308D are formed at the same time by pressing or punching. Then, a pressing step (represented by the areas 308A and 308B), an insert molding step (represented by the area 308C), and a separating step (represented by the area 308D) are performed in sequence on the respective areas 308A through 308D while feeding the pressed plate 308 in the feeding direction indicated by the arrow in FIG. 15A.

Alternatively, the same step may be performed at the same time on multiple areas.

In the example illustrated in FIG. 15A, the areas 308A through 308D of the pressed plate 308 are arranged in a line. Alternatively, multiple areas may be arranged in rows and columns. When multiple areas are arranged in rows and columns in a pressed plate, the same step (the pressing step, the insert molding step, or the separating step) may be performed at the same time on areas arranged in a direction orthogonal to the feeding direction.

As described above, in the third embodiment, the pressed plate 308 with the terminals 310 is prepared by pressing, for example, a hoop material and the holder 304 is formed by insert molding to manufacture the module 300A.

Meanwhile, in a related-art method, a module (corresponding to the module 300A of this embodiment) is manufactured by forming holes in a holder and inserting terminals into the holes. Such a related-art method requires extra steps of forming holes in the holder and inserting the terminals into the holes (i.e., increases the number of manufacturing steps) and therefore increases manufacturing costs. This in turn increases the costs of a camera module.

Also with the related-art method, it is difficult to accurately position the terminals.

The method of manufacturing the module 300A of the third embodiment makes it easier to manufacture the camera module 300 and thereby makes it possible to reduce the manufacturing costs of the camera module 300.

Also, the method of manufacturing the module 300A of the third embodiment makes it possible to accurately position the terminals 310. Since the terminals 310 are connected with the autofocus part 301 via the conductive adhesives 302, the positional accuracy of the terminals 310 greatly affects the reliability and the production yield of the camera module 300.

Accordingly, the third embodiment makes it possible to improve the reliability and the production yield of the camera module 300.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:
1. A camera module, comprising:
   plural terminals formed by pressing a metal plate;
   a holder formed by insert molding so as to surround and hold the terminals and having a through hole extending in a length direction of the terminals;
   a lens fitted into the through hole; and
   a camera unit attached to the holder and disposed behind the lens, wherein
   the terminals include cut-off parts that are cut off from carriers of the metal plate to separate the holder from the metal plate;
   the cut-off parts penetrate through a wall of the holder; and
   ends of the cut-off parts are in a recess formed in an outer surface of the wall of the holder.
2. A method of manufacturing a camera module, the method comprising:
   pressing a metal plate to form multiple sets of terminals;
   forming a holder for each set of the terminals by insert molding so as to surround and hold the terminals, the holder having a through hole extending in a length direction of the terminals;
   fitting a lens into the through hole;
   attaching a camera unit to the holder at a position behind the lens; and
   separating the holder from the metal plate.
3. The method as claimed in claim 2, wherein
   the metal plate is a hoop material; and
   pressing the metal plate includes pressing the hoop material to form the multiple sets of the terminals.

* * * * *